United States Patent [19]
Derr

[11] Patent Number: 5,781,335
[45] Date of Patent: Jul. 14, 1998

[54] CIRCUIT ARRANGEMENT FOR OPTICAL FREQUENCY CONVERSION

[75] Inventor: Frowin Derr, Munich, Germany

[73] Assignee: Siemens Aktiengesellschaft, Munich, Germany

[21] Appl. No.: 843,314

[22] Filed: Apr. 15, 1997

Related U.S. Application Data

[63] Continuation of Ser. No. 587,994, Jan. 17, 1996, abandoned.

[30] Foreign Application Priority Data

Feb. 16, 1995 [DE] Germany ................. 195 05 291.9

[51] Int. Cl.⁶ .................................................. G02F 1/35
[52] U.S. Cl. ............................................................ 359/326
[58] Field of Search ..................................... 359/326–332

[56] References Cited

U.S. PATENT DOCUMENTS

| | | | |
|---|---|---|---|
| 4,919,512 | 4/1990 | Flaherty | 359/326 X |
| 4,989,200 | 1/1991 | Olshansky et al. | 359/132 |
| 5,202,780 | 4/1993 | Fussgänger | 359/125 |

OTHER PUBLICATIONS

"Optical Wavelength Converters," Stubkjaer et al., ECOC '94, vol. 2, pp. 635–642, 1994 (No Month).

"Polarization Insensitive Frequency Conversion of a 10-Channel OFDM Signal Using Four-Wave-Mixing in a Semiconductor Laser Amplifier," Schnabel et al., IEEE Photonics Technology Letters, vol. 6, No. 1, Jan., 1994, pp.56–58.

"All-Optical Wavelength Conversion with Extinction Ratio Enhancement Using a Tunable DBR Laser," Ottolenghi et al., Paper TuC5.5, pp. 141–144 (No Journal Name or Date).

"Flat-Field Spectrograph in SiO₂/SI," Clemens et al., IEEE Photonics Technology Letters, vol. 4, No. 8, 1992, pp. 886–887, (No Month Given).

"10 Gbit/s Wavelength Converter Realised By Monolithic Integration of Semiconductor Optical Amplifiers and Michelson Interferometer," Mikkelsen et al., ECOC '94, vol. 4, Post-Deadline Papers pp. 67–70, 1994 (No Month).

*Primary Examiner*—John D. Lee
*Attorney, Agent, or Firm*—Hill & Simpson

[57] ABSTRACT

In a circuit arrangement for optical frequency conversion, having a switchable input filter arrangement with a wavelength channel filter of a wavelength multiplexer/demultiplexer which is formed using a number of such channel filters, which filter can be connected via a 1:n fiber switch to an input fiber and is passed through by the input signal in the multiplex operating direction, a frequency converter which is passed through in opposite directions by the input signal and a pump laser signal, and an output filter, the output filter is formed by a wavelength channel filter of the wavelength multiplexer/demultiplexer, which filter is passed through by the output signal in the demultiplex operating direction and is connected on the output side to the output fiber.

4 Claims, 1 Drawing Sheet

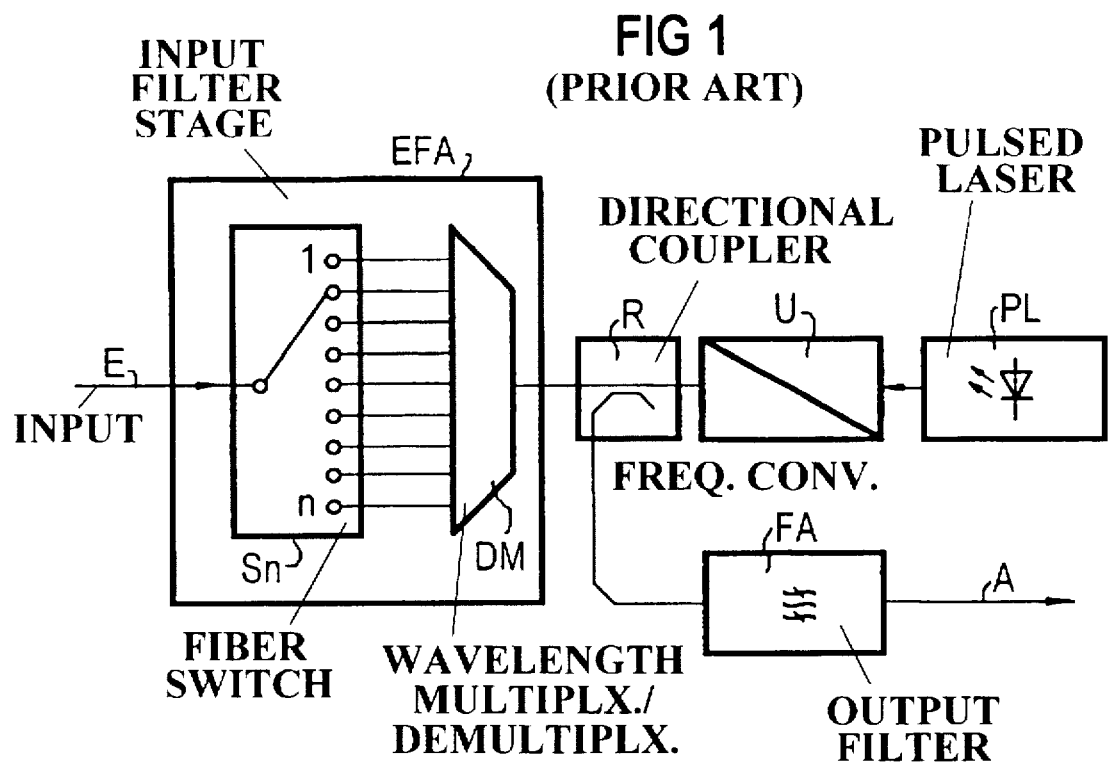
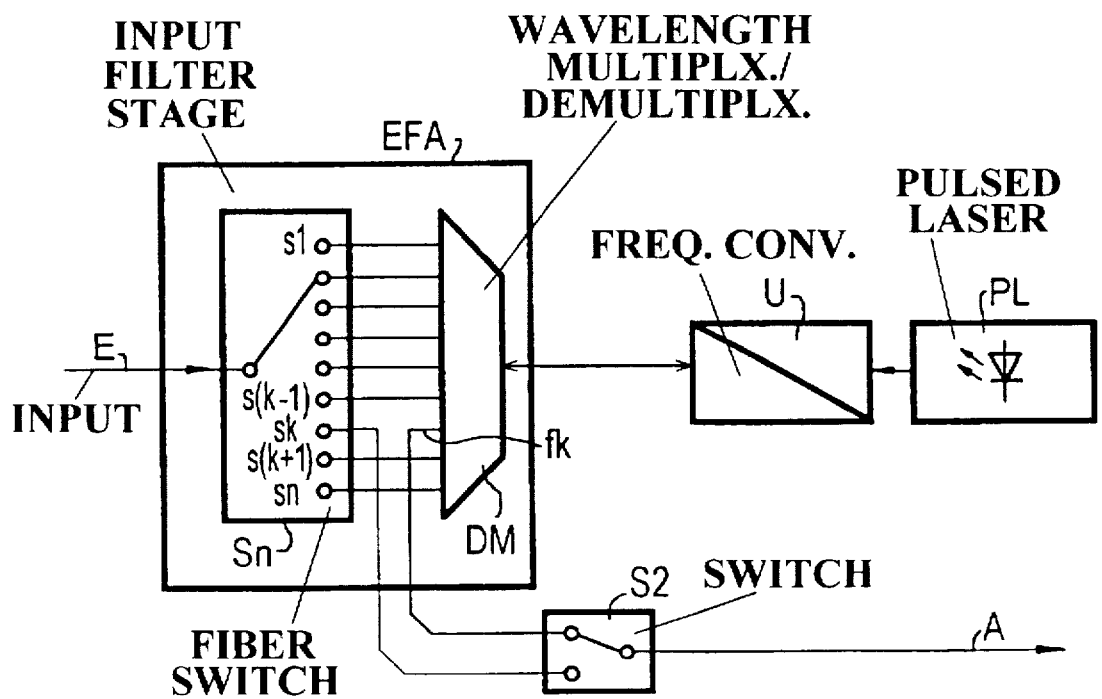

ly optical
telecommunications networks. Such an optical frequency
CIRCUIT ARRANGEMENT FOR OPTICAL FREQUENCY CONVERSION This is a continuation of application Ser. No. 08/587,994, filed Jan. 17, 1996 (abandoned).

BACKGROUND OF THE INVENTION

1. Field of the Invention

The present invention is directed to an optical frequency converter of the type for converting an input optical signal having an input wavelength to an output optical signal having an output wavelength, the output wavelength being different from the input wavelength.

2. Description of the Prior Art

Optical frequency converters for the conversion of an optical signal from an input wavelength to an output wavelength which is different from the input wavelength are essential components of network nodes in purely optical telecommunications networks. Such an optical frequency conversion can proceed on the basis of various physical principles, for example in accordance with the principle of cross gain modulation or that of cross phase modulation (see ECOC'94, Vol. 2, pp. 635–642).

In practice, arrangements for optical frequency conversion having a variable input wavelength and a fixed output wavelength have proved to be expedient; such arrangements need a switchable input filter and an output filter (see IEEE Photon. Technol. Lett., 6 (1994) 1, pp. 56–58; ECOC'93, paper TuC5.5).

One possible configuration of a circuit arrangement for optical frequency conversion includes a switchable input filter arrangement with a wavelength channel filter of a wavelength multiplexer/demultiplexer which is formed using a plurality of such channel filters. This switchable input filter can be connected via a 1:n fiber switch to an input fiber and the input signal passes through this switchable input filter in the multiplex operating direction. The configuration also includes a frequency converter through which the input signal passes in an opposite direction, a pump laser which generates a pump laser signal having a frequency to which the input signal is to be converted, and an output filter.

SUMMARY OF THE INVENTION

It is an object of the present invention to provide an optical frequency converter of the type described immediately above wherein the number of components and thus the overall circuit outlay are reduced, without degrading the operation of the converter.

The above object is achieved in general by the recognition that the output filter in the known circuit of type described immediately above can be combined into one of the other already-existing components.

More specifically, the above object is achieved in a circuit arrangement for optical frequency conversion of the described immediately above wherein the output filter is formed by a wavelength channel filter of the wavelength multiplexer/demultiplexer, the output signal passing through this output filter in the demultiplex operating direction, and the output filter being connected at the output side to the output fiber.

The invention, as a consequence of which the task of an output filter is also fulfilled using the optical wavelength multiplexer/demultiplexer which is present in any case, has the advantage of not needing a separate output filter or an optical directional coupler inserted between the wavelength multiplexer/ demultiplexer and frequency converter.

In a further embodiment of the invention, the output of the aforementioned output filter formed by a wavelength channel filter of the wavelength multiplexer/demultiplexer, and the output of the 1:n fiber switch, can be connected via a 2:1 selection switch to the output fiber. This makes it possible also to be able to switch through a signal from the input fiber to the output fiber which is not to be converted in terms of its optical frequency.

DESCRIPTION OF THE DRAWINGS

FIG. 1 is a schematic block diagram of a known circuit arrangement for optical frequency conversion with a separate output filter.

FIG. 2 is a schematic block diagram of a circuit arrangement constructed in accordance with the principles of the present invention for optical frequency conversion without a separate output filter.

DESCRIPTION OF THE PREFERRED EMBODIMENTS

In the known circuit arrangement for optical frequency conversion, which is sketched in FIG. 1, a switchable input filter arrangement EFA is provided with a 1:n fiber switch Sn which is connected to an input fiber E (carrying an input signal to be frequency-converted) and a wavelength multiplexer/demultiplexer DM (see IEEE Photon. Technol. Lett., 4 (1992) 8, pp. 886–887). The wavelength multiplexer/demultiplexer is formed by a plurality of wavelength channel filters and is connected by means thereof on the input side to the outputs of the 1:n fiber switch Sn. A frequency converter U is connected downstream of the multiplex output of the wavelength multiplexer/demultiplexer DM via an optical directional coupler R. The frequency converter U is passed through in opposite directions by the input signal to be converted and a light signal which is generated by a pump laser PL. The wavelength of the input signal is to be converted to the wavelength of the light signal.

For receiving the optical input signal, which has an optical input frequency lying in one division of an optical channel grid 1 . . . n, the wavelength channel filter corresponding to the optical input frequency is switched to an active state by means of a corresponding setting of the 1:n fiber switch Sn in the switchable input filter arrangement EFA, realized by the optical 1:n fiber switch Sn and the wavelength multiplexer/demultiplexer DM. The filter in this arrangement undertakes the tasks of selecting the input channel with the wavelength to be converted, suppressing undesired signal components in the adjacent optical channels, and limiting optical noise components present in the input signal.

The following frequency converter U, which can operate, for example, in accordance with either the principle of cross gain modulation or cross phase modulation, is operated in opposite directions (see ECOC'94, Vol. 4, Post-deadline Papers, pp. 67–70), the input signal and the pump laser signal, to whose wavelength the input signal is to be converted, pass through the frequency converter U in opposite directions. By means of the optical directional coupler R which is inserted between the wavelength multiplexer/demultiplexer DM and the frequency converter U, the pump laser signal, which is modulated by the input signal, is coupled out to an output filter FA whose filter characteristics can be fixed and which performs the tasks of filtering the desired output channel, suppressing undesired input signal components, and limiting optical noise components produced in the frequency converter U.

In the inventive circuit arrangement for optical frequency conversion shown in FIG. 2, a switchable input stage arrangement EFA is likewise provided with a 1:n fiber switch Sn which is connected to an input fiber E and a wavelength multiplexer/demultiplexer DM, formed by a plurality of wavelength channel filters and is connected by means thereof at the input side to the outputs s1,... .sn of the 1:n fiber switch Sn. A frequency converter U is connected to the multiplex output of the wavelength multiplexer/demultiplexer DM. The frequency converter U is passed through, in opposite directions by the input signal to be converted and the light signal which is generated by a pump laser PL. Again, the wavelength of the input signal is to be converted to the wavelength of the light signal.

The input signal is switched by means of the optical 1:n fiber switch Sn to that one of the (n-1) inputs s1,... .s(k-1) and s(k+1),... .sn (seen in the multiplex operating direction) of the wavelength multiplexer/demultiplexer DM, which leads to the wavelength channel filter corresponding to the optical input frequency. In the direction from left to right, i.e., in the multiplex operating direction, the wavelength multiplexer/demultiplexer DM hence undertakes the task of the input filtering as described above.

The following frequency converter U is operated in opposite directions, i.e., the input signal and the pump laser signal, to whose wavelength the input signal is to be converted, pass through the frequency converter U in opposite directions. The pump laser signal, which is modulated by the input signal, and whose fixed optical frequency in the optical channel grid 1 ... n is intended to correspond to channel k, now passes to the multiplex output/demultiplex input of the wavelength multiplexer/demultiplexer DM, which is effective for the output signal in the demultiplex operating direction, and from here passes further, via the wavelength channel filter corresponding to the optical output frequency, to the multiplex input/demultiplex output fk, which leads to the output fiber A. To this extent, the wavelength multiplexer/demultiplexer DM therefore also undertakes the task of output filtering.

If it is intended also to be able to switch through a signal from the input fiber to the output fiber, which is not to be converted in terms of its optical frequency, then, as can also be seen from FIG. 2, the output fk of the wavelength channel filter which is passed through in the demultiplex operating direction of the wavelength multiplexer/demultiplexer DM, and the output sk corresponding thereto of the 1:n fiber switch Sn, can be connected via a 2:1 selection switch S2 to the output fiber A. An input signal can then be routed from the input fiber E onto the output fiber A as an output signal without frequency conversion via the 1:n fiber switch Sn, which is set to its output sk, and the 2:1 selection switch S2.

Although modifications and changes may be suggested by those skilled in the art, it is the intention of the inventor to embody within the patent warranted hereon all changes and modifications as reasonably and properly come within the scope of the inventor's contribution to the art.

I claim as my invention:

1. A circuit for converting a frequency of an optical input signal from a first frequency to a second frequency, comprising:

an optical fiber switch having an input to which an input optical signal having a first frequency is supplied and having n outputs respectively corresponding to different frequency ranges including one output having a range encompassing a second frequency to which said optical input signal is to be converted;

a wavelength multiplexer/demultiplexer comprising n wavelength channel filters respectively corresponding to said different frequency ranges of said optical fiber switch and having n-1 first ports respectively connecting said wavelength channel filters to said n outputs, except said one output, of said optical fiber switch, a free port connected to one of said wavelength channel filters encompassing said second frequency, and a second port, said wavelength multiplexer/demultiplexer being operable in a multiplexing direction to pass said optical input signal through to said second port;

a pulsed laser which generates a pulsed laser signal at said second frequency;

frequency converter means supplied with said pulsed laser signal from said pulsed laser and with said input optical signal from said second port of said wavelength multiplexer/demultiplexer for converting said optical input signal into an output optical signal having said second frequency and for supplying said output signal to said second port of said wavelength multiplexer/demultiplexer; and said wavelength multiplexer/demultiplexer being operable in an opposite demultiplexing direction for passing said output optical signal through said one of said wavelength channel filters encompassing said second frequency and for emitting said output signal at said free port.

2. A circuit as claimed in claim 1 further comprising a 2:1 selection switch having first and second switch inputs selectively switchable through to one switch output, said first switch input being connected to said one output of said fiber switch and said second switch input being connected to said free port of said wavelength multiplexer/demultiplexer.

3. A circuit for converting a frequency of an optical input signal from a first frequency to a second frequency, comprising:

an optical fiber switch having an input to which an input optical signal having a first frequency is supplied and having at least n-1 outputs;

a wavelength multiplexer/demultiplexer comprising n wavelength channel filters respectively corresponding to said different frequency ranges and having n-1 first ports respectively connecting n-1 of said wavelength channel filters to said at least n-1 outputs of said optical fiber switch, a free port connected to one of said wavelength channel filters encompassing said second frequency, and a second port, said wavelength multiplexer/demultiplexer being operable in a multiplexing direction to pass said optical input signal through to said second port;

a pulsed laser which generates a pulsed laser signal at said second frequency;

frequency converter means supplied with said pulsed laser signal from said pulsed laser and with said input optical signal from said second port of said wavelength multiplexer/demultiplexer for converting said optical input signal into an output optical signal having said second frequency and for supplying said output signal to said second port of said wavelength multiplexer/demultiplexer; and said wavelength multiplexer/demultiplexer being operable in an opposite demultiplexing direction for passing said output optical signal through said one of said wavelength channel filters encompassing said second frequency and for emitting said output signal at said free port.

4. A circuit as claimed in claim 3 further comprising a 2:1 selection switch having first and second switch inputs selectively switchable through to one switch output, said first switch input being connected to an nth output of said fiber switch and said second switch input being connected to said free port of said wavelength multiplexer/demultiplexer.

* * * * *